(12) United States Patent
Wu et al.

(10) Patent No.: US 8,385,442 B2
(45) Date of Patent: Feb. 26, 2013

(54) TRANSMITTER AND THE METHOD THEREFOR

(75) Inventors: Jia-Hao Wu, Gueishan Township, Taoyuan County (TW); Yun-Yi Shih, Gueiren Township, Tainan County (TW); Pang-An Ting, Fongyuan (TW); Ming-Che Lin, Longjing Township, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 536 days.

(21) Appl. No.: 12/643,042

(22) Filed: Dec. 21, 2009

(65) Prior Publication Data

US 2010/0166105 A1    Jul. 1, 2010

(30) Foreign Application Priority Data

Dec. 31, 2008   (TW) ................ 97151865 A (51) Int. Cl.
*H04L 27/28* (2006.01)
(52) U.S. Cl. ...................................... 375/260
(58) Field of Classification Search .......... 375/260, 375/346

See application file for complete search history.

(56) References Cited

U.S. PATENT DOCUMENTS

| | | | |
|---|---|---|---|
| 6,845,082 B2 | 1/2005 | Bourget et al. | |
| 7,292,639 B1* | 11/2007 | Demirekler et al. | ......... 375/260 |
| 7,340,006 B2 | 3/2008 | Yun et al. | |
| 2005/0238110 A1 | 10/2005 | Yun et al. | |
| 2007/0071120 A1* | 3/2007 | Talwar | ............ 375/260 |
| 2007/0116142 A1* | 5/2007 | Molander | ............ 375/260 |
| 2007/0140101 A1 | 6/2007 | Guo et al. | |
| 2008/0101502 A1 | 5/2008 | Navidpour et al. | |
| 2009/0310692 A1* | 12/2009 | Kafle et al. | ............ 375/260 |
| 2012/0033643 A1* | 2/2012 | Noh et al. | ............ 370/335 |

OTHER PUBLICATIONS

Chapter 4 of "Par Reduction by Tone Reservation;" pp. 65-85, Sep. 30, 2000.

Tellado, J., et al.; "Efficient Algorithms for Reducing PAR in Multicarrier Systems;" IEEE; 1998; p. 191.

* cited by examiner

*Primary Examiner* — Don N Vo
(74) *Attorney, Agent, or Firm* — McClure, Qualey & Rodack, LLP (57) ABSTRACT

A transmitter and the method therefor are provided. The transmitter is applied in an orthogonal frequency division multiplexing (OFDM) based or other multicarrier communication systems. The transmitter uses N sub-carriers. Among the N sub-carriers, L sub-carriers (or tones) are reserved for PAPR reduction. L is less than N. The method includes the following steps. Original frequency domain data symbols are generated and fed into the reserved-tone symbol generation unit. The reserved-tone symbols are generated by using pure frequency domain signal processing. Then the reserved-tone symbols are combined with original data symbols to generate combined PAPR reduction signal. The resultant PAPR reduction signal can be fed into reserved-tone symbol generation unit iteratively to obtain updated reserved-tone symbols. For proper iterations, the original data symbols combined with L frequency domain reserved-tone symbols will result in lower PAPR transmit signal.

10 Claims, 7 Drawing Sheets

TRANSMITTER AND THE METHOD THEREFOR

This invention claims the benefit of Taiwan invention Serial No. 97151865, filed Dec. 31, 2008, the subject matter of which is incorporated herein by reference.

TECHNICAL FIELD

The invention relates in general to a transmitter and a method therefor, and more particularly to a transmitter for use in the frequency domain to control a peak-to-average power ratio (PAPR) thereof and a method therefor.

BACKGROUND

Figure 1:
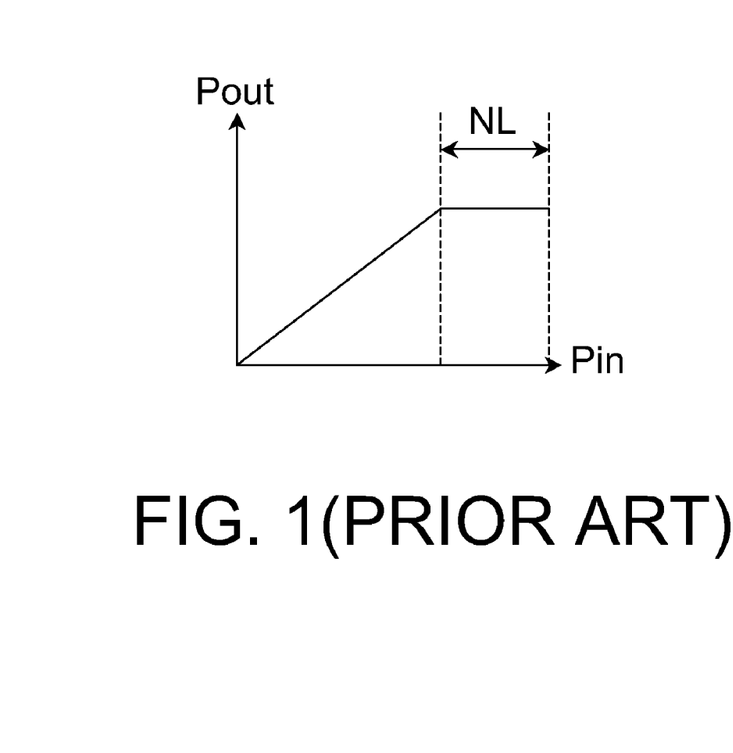
FIG. 1 is a diagram showing the relationship between the input power Pin and the output power Pout of a power amplifier.

In orthogonal frequency division multiplexing (OFDM) based communication systems, a high peak-to-average power ratio (PAPR) may decrease the signal quality or deteriorate the transmitting power efficiency for a transmitter. The reason is that the transmitter usually has non-linear RF front end circuits such as a power amplifier. FIG. 1 is a diagram showing the relationship between the input power Pin and the output power Pout of a power amplifier. When the peak power of the input power Pin reaches the non-linear region NL, the output signal of the power amplifier is distorted, and thus decreasing the transmitted signal quality. If the input power Pin is reduced to a value in the linear region of the power amplifier, the transmitting power efficiency will be deteriorated.

Figure 2:
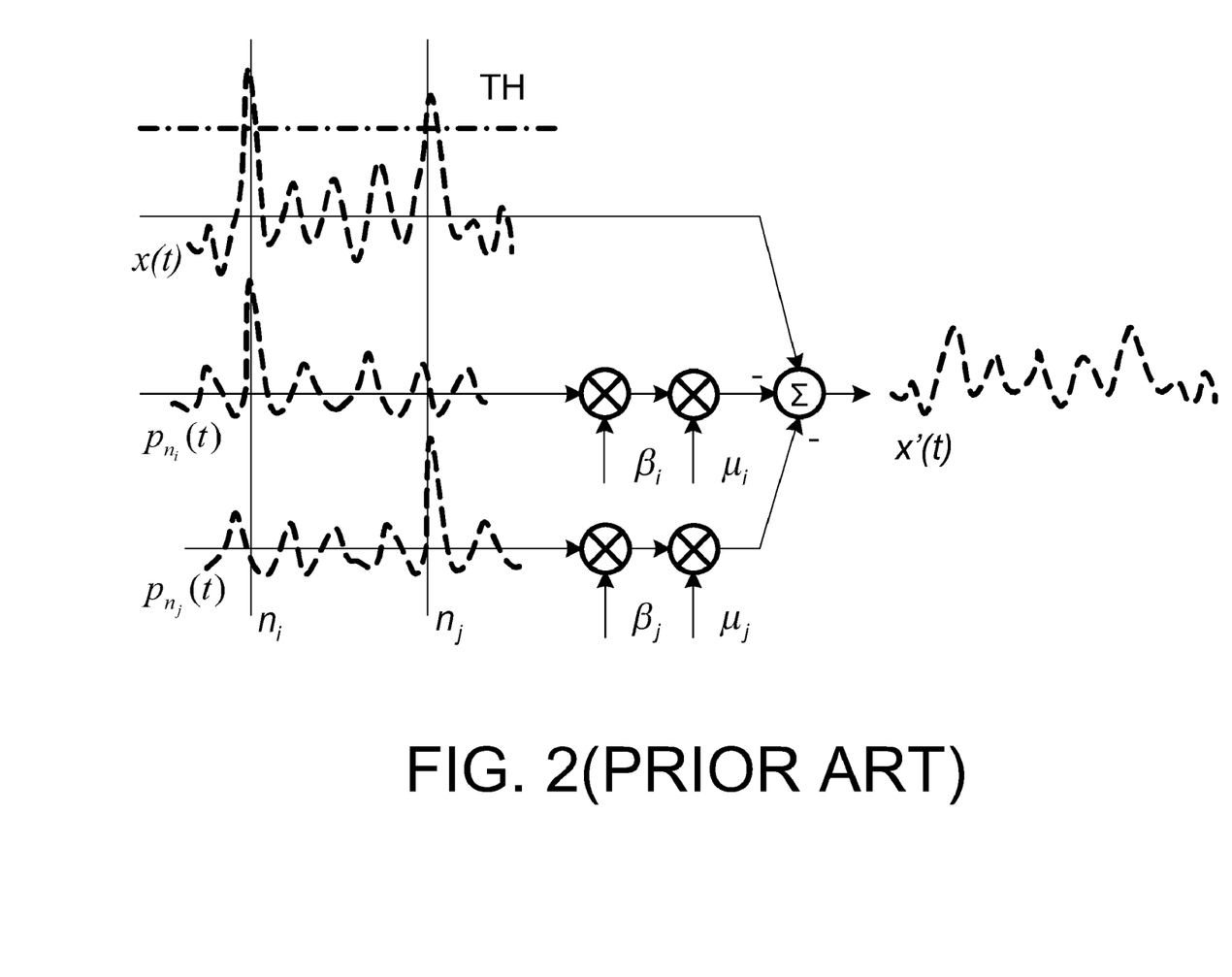
FIG. 2 (Prior Art) is a schematic diagram showing a conventional method for reducing the PAPR.

In a multi-carrier communication system, e.g. in the orthogonal frequency-division multiple access (OFDMA) mode in compliance with the IEEE 802.16e standard, the base station (BS) can reserve some sub-carriers (which may also be referred to as tones), and reduce the high PAPR by making use of the reserved sub-carriers. FIG. 2 is a schematic diagram showing a conventional method for reducing the PAPR. The original signal which is to be transmitted is denoted as x(t) in time domain. As can be seen from FIG. 2, the to-be-transmitted original signal x(t) exceeds the threshold TH with two peaks. Conventionally, some peak reduction signals P(t) are generated from the reserved sub-carriers, and are cyclically shifted to the time points ni and nj, respectively, so as to provide two signals $P_{ni}(t)$ and $P_{nj}(t)$. The signals $P_{ni}(t)$ and $P_{nj}(t)$ are respectively multiplied by a corresponding phase parameter and a corresponding amplitude parameter, i.e. $\beta_i$ and $\mu_i$ as well as $\beta_j$ and $\mu_j$, and the summation of the multiplied signals and the signal x(t) is performed to obtain a to-be-transmitted modified signal x'(t) with lower PAPR.

However, in the conventional method, at least two Inverse Fast Fourier Transform (IFFT) circuits are required for generating the signals x(t) and P(t). Moreover, in order for the to-be-transmitted signal x'(t) to keep the low PAPR, the conventional method usually performs a procedure of over-sampling on the signal with a over-sampling rate being larger than 4, and performs the above-mentioned procedure of PAPR reduction thereafter.

BRIEF SUMMARY

Embodiments of a transmitter and a method therefor are provided. Processing in frequency domain prevents the present embodiment from having to use a number of operations of IFFT, and allows the present embodiment to be realized without over-sampling.

An exemplary embodiment of a method is provided for obtaining a peak-to-average power ratio (PAPR) and being applied in a transmitter of a multicarrier communication system. The transmitter using N sub-carriers, wherein L sub-carriers of the N sub-carriers are reserved sub-carriers and L is less than N. The method includes the following steps. Receive a data signal, wherein the envelope power of the data signal has a constant power and a fluctuant power. Generate L reserved sub-carrier symbols of the L sub-carriers located in the reserved sub-carriers. Modify the L reserved sub-carrier symbols according to the data signal, and generate a to-be-combined signal accordingly. Combine the to-be-combined signal into the data signal in frequency domain.

Another exemplary embodiment of a transmitter is provided for being applied in an orthogonal frequency division multiplexing (OFDM) system. The transmitter uses N sub-carriers, wherein L sub-carriers of the N sub-carriers are reserved sub-carriers and L is less than N. The transmitter includes a modulation unit, a reserved sub-carrier symbol generation unit, and a combination unit. The modulation unit is for outputting a data signal. The envelope power of the data signal having a constant power and a fluctuant power. The reserved sub-carrier symbol generation unit is for generating L reserved sub-carrier symbols of the L sub-carriers located in the reserved sub-carriers, and is further for modifying the L reserved sub-carrier symbols according to the data signal and generating a to-be-combined signal accordingly. The combination unit is for combining the to-be-combined signal into the data signal in frequency domain.

It is to be understood that both the foregoing general description and the following detailed description are exemplary and explanatory only and are not restrictive of the disclosed embodiments, as claimed.

DETAILED DESCRIPTION OF THE APPLICATION

The disclosed embodiment provides a method for obtaining a peak-to-average power ratio (PAPR). The method can be applied in a transmitter of a multicarrier communication system. The transmitter uses N sub-carriers, wherein L sub-carriers of the N sub-carriers are regarded as the reserved sub-carriers, and L is less than N. The method includes the following steps. Receive a data signal, wherein the envelope power of the data signal has a constant power and a fluctuant power. Generate L reserved sub-carrier symbols located on the L reserved sub-carriers. Modify the L reserved sub-carrier symbols according to the data signal, and generate a to-be-combined signal accordingly. Combine the to-be-combined signal into the data signal in frequency domain, so that the fluctuant power corresponding to the modified data signal can be decreased while the PAPR of the transmitting signal can be reduced. An embodiment is provided for further elaboration below.

Figure 3:
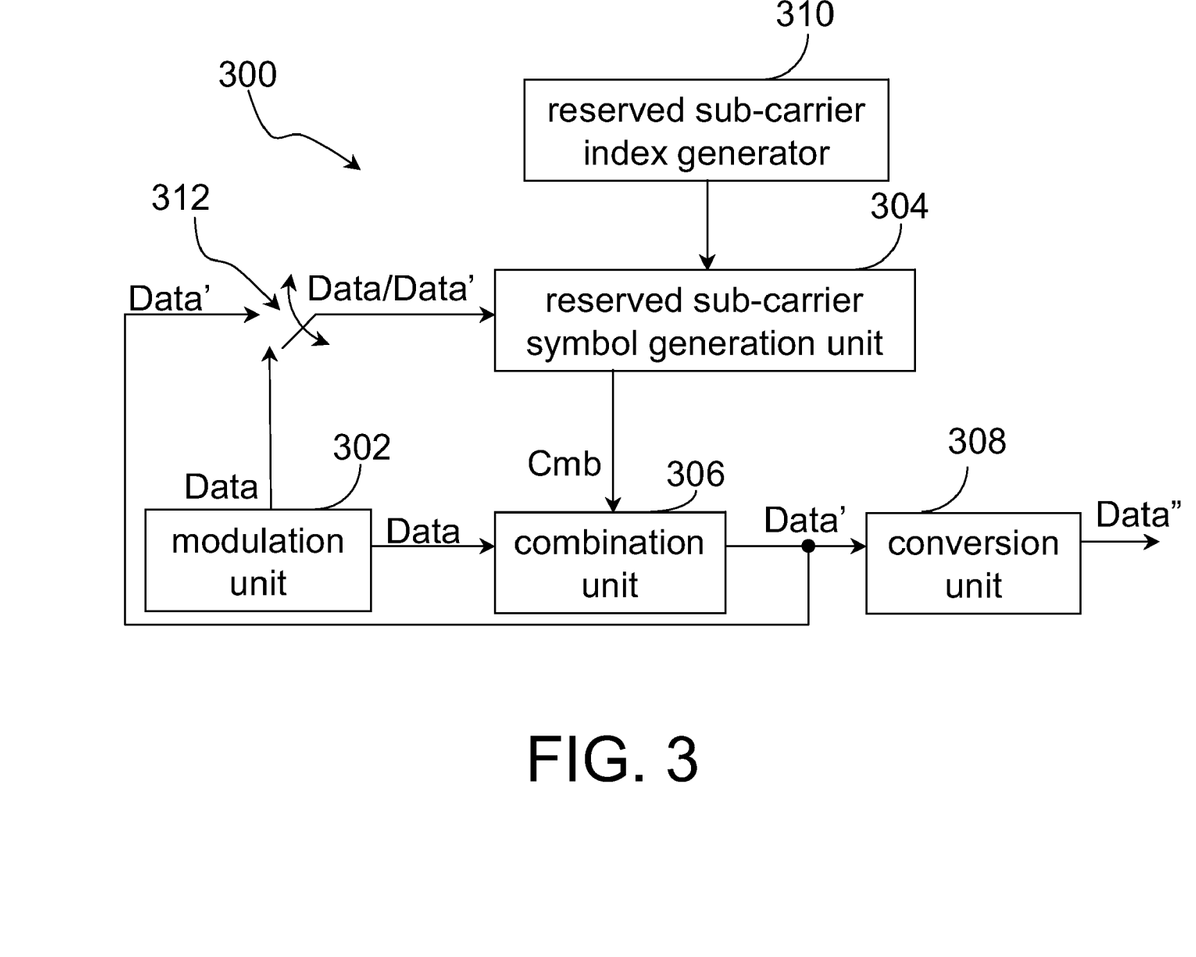
FIG. 3 is a block diagram showing a transmitter 300 for reducing the PAPR of the data signal according to an exemplary embodiment.

FIG. 3 is a block diagram showing a transmitter for reducing the PAPR of the data signal according to an exemplary embodiment. The multicarrier communication system mentioned above can be, for example, an OFDM communication system. The transmitter 300 includes a modulation unit 302, a reserved sub-carrier symbols generation unit 304, and a combination unit 306. The modulation unit 302 is for outputting a data signal Data, wherein the power of the data signal Data has a constant power and a fluctuant power. The reserved sub-carrier symbols generation unit 304 is for generating L reserved sub-carrier symbols located on the L reserved sub-carriers. The reserved sub-carrier symbols generation unit 304 is further for modifying the L reserved sub-carrier symbols according to the data signal Data, and generating a to-be-combined signal Cmb accordingly. The combination unit 306 is for combining the to-be-combined signal Cmb into the data signal Data, so that the fluctuant power corresponding to the modified data signal Data' can be decreased and consequently the PAPR of the transmitting signal can be reduced.

For further description, assume that the sub-carrier indices of the N sub-carriers being used in the transmitter 300 are denoted as 0 to N−1, and a set of sub-carrier indices of the L reserved sub-carriers in the N sub-carriers is denoted as U, wherein $U=\{k_0, k_1, \ldots k_{L-1}\}$. The data signal Data has N data symbols $X_0, X_1, \ldots, X_{N-1}$ located on the N sub-carriers. The data vector is defined as $X=[X_0, X_1, \ldots, X_{N-1}]^T$, wherein $X_i$ is the $i^{th}$ data symbol, and i is an integer between 0 to N−1. In order to avoid the transmitting signal from being interfered with the reserved sub-carrier symbols, assume that $i \in U$, $X_i=0$ before the data is combined into the reserved sub-carrier symbol. However, the method for reducing the PAPR of the data signal provided in the disclosed embodiment should not be limited to this assumption.

Besides, the L reserved sub-carrier symbols are defined as $X_{k_0}, X_{k_1}, \ldots, X_{k_{L-1}}$, and the reserved sub-carrier symbol vector is defined as $X_R=[X_{k_0}, X_{k_1}, \ldots, X_{k_{L-1}}]^T$. Assume that the to-be-combined signal Cmb mentioned above has N combination symbols $C_0, C_1, \ldots, C_{N-1}$, and a combination vector C is defined as $C=[C_0, C_1, \ldots, C_{L-1}]^T$, wherein $C_i$ is the $i^{th}$ combination symbol. Similarly, assume that if $i \notin U$ or $i \in U^C$, $X_i=0$. However, the method for reducing the PAPR of the data signal provided in the disclosed embodiment should not be limited to this assumption.

The embodiment can be illustrated by the equation (1) as follows:

$$\text{find } \hat{C} \text{ such that } \hat{C} = \underset{c}{\text{argmin}} \|x + c\| = \underset{c}{\text{argmin}} \|F(X + C)\|_\infty \quad (1)$$

where x and c denote the time domain data signal Data and the to-be-combined signal Cmb, respectively. X and C are their frequency domain counterparts and F denotes an IFFT matrix with a size of N×N, wherein:

$$\{F\}_{n,k} = e^{j2\pi \frac{nk}{N}} \text{ for } n, k = 0, 1, \ldots, N-1.$$

In equation (1), after all possible values of c are individually added to x, one value of c is selected so that the maximum of the norms of the vector x+c is at its minimum with the selected value of c. Such selected value of c can make the peak power of x+c the smallest, thus decrease the peak power of the data signal Data' and reduce the PAPR. The way to find out the c complied with the condition mentioned above can be achieved by finding out a corresponding C.

How this embodiment found out the above-mentioned C is described as follows.

As for an OFDM system, the time-domain data signal Data can be defined as:

$$x(t) = \sum_{k=0}^{N-1} X_k e^{j2\pi \frac{k}{N} t} \quad (2)$$

where $0 \leq t \leq T$ and T denotes the symbol duration.

The envelope power of signal x(t) can be defined as:

$$P_x(t) = \left| \sum_{k=0}^{N-1} X_k e^{j2\pi \frac{k}{T} t} \right|^2 = \sum_{k=0}^{N-1} |X_k|^2 + 2\text{Re}\left\{ \sum_{u=1}^{N-1} \rho(u) e^{-j2\pi \frac{u}{T} t} \right\} \quad (3)$$

where, it is defined that $$\rho(u) = \sum_{k=0}^{N-u-1} X_k X_{k+u}^* \text{ for } 1 \leq u \leq N-1,$$

wherein $\rho(u)$ can be referred to as an aperiodic auto-correlation function (AACF) of $\{X_k\}_0^{N-1}$.

In this embodiment, the $$\sum_{k=0}^{N-1} |X_k|^2$$

in equation (3) is defined as the constant power, and the $$2\text{Re}\left\{ \sum_{u=1}^{N-1} \rho(u) e^{-j2\pi \frac{u}{T} t} \right\}$$

in equation (3) is defined as the fluctuant power. Because the $$\sum_{k=0}^{N-1} |X_k|^2$$

is the constant power and will not vary with respect to the time t, the level of $P_x(t)$ is determined by the level of $$2\mathrm{Re}\left\{\sum_{u=1}^{N-1}\rho(u)e^{-j2\pi\frac{u}{T}t}\right\}$$

which is varied with respect to the time t. As a result, minimizing the $P_x(t)$ can be achievable if the fluctuant power can be minimized. In general, it is difficulty in minimizing the fluctuant power which is varied with respect to the time t. Therefore, we are turning to expected that the "p-absolution value" for the AACF (i.e. the absolute value for the AACF to the $p^{th}$ power) can have a sum $$\sum_{u=1}^{N-1}\|\rho(u)\|^p$$

as small as possible, wherein p is larger than 0 or is a positive integer.

Once such a set of $\{X_k\}_0^{N-1}$ can be found out so as to minimize the $$\sum_{u=1}^{N-1}\|\rho(u)\|^p,$$

we then can expect to obtain a reduced fluctuant power. Let's take p be equal to 2 as an example for description as follows, but this embodiment is not limited thereto. In this example, the embodiment modifies the reserved sub-carrier symbols $X_{k_0}, X_{k_1}, \ldots, X_{k_{L-1}}$ corresponding to the reserved sub-carriers in $\{X_k\}_0^{N-1}$, so as to minimize $$\sum_{u=1}^{N-1}\|\rho(u)\|^2.$$

This embodiment further modifies the values of the reserved sub-carrier symbols $X_{k_0}, X_{k_1}, \ldots, X_{k_{L-1}}$ by way of steepest descent, thus to minimize $$\sum_{u=1}^{N-1}\|\rho(u)\|^2.$$

Further description about the equations is provided as follows. Through mathematic derivation, an equation (4) can be obtained as:

$$\|\rho(u)\|^2 = \sum_{m=0}^{N-u-1}\sum_{k=0}^{N-u-1} X_k X_m^* X_{k+u}^* X_{k+u}. \quad (4)$$

After a partially differentiation is performed on the equation (4), an equation (5) can be obtained as:

$$\frac{\partial}{\partial X_{k_i}^*}\|\rho(u)\|^2 = 2\left[X_{k_i-u}\left(\sum_{k=0}^{N-u-1}X_k X_{k+u}^*\right)^* + X_{k_i+u}\left(\sum_{k=0}^{N-u-1}X_k X_{k+u}^*\right)\right] \quad (5)$$

where $i=0, 1, \ldots, L-1$, and $u+1 \leq k_i \leq N-u-1$.

Next, the AACF vector is defined as $\rho = [\rho(1), \rho(2), \ldots, \rho(N-1)]^T$ and the square of the absolute value of the vector p, i.e. $\|\rho\|^2$, is equal to $$|\rho(1)|^2 + |\rho(2)|^2 + \ldots + |\rho(N-1)|^2, \text{ i.e. } \sum_{u=1}^{N-1}\|\rho(u)\|^2.$$

Hence, the partial differentiation taken on the AACF vector can be derived as:

$$\frac{\partial}{\partial X_{k_i}^*}\|\rho\|^2 = \frac{\partial}{\partial X_{k_i}^*}\sum_{u=1}^{N-1}\|\rho(u)\|^2 = \quad (6)$$

$$2\sum_{u=1}^{N-1}\left[X_{k_i-u}\left(\sum_{k=0}^{N-u-1}X_k X_{k+u}^*\right)^* + X_{k_i+u}\left(\sum_{k=0}^{N-u-1}X_k X_{k+u}^*\right)\right].$$

Besides, the reserved sub-carrier symbol vector can be defined as $X_R = [X_{k_0}, X_{k_1}, \ldots, X_{k_{L-1}}]^T$. The steepest descent for modifying the $X_R$ mentioned above is to modify the L reserved sub-carrier symbols $X_{k_0}, X_{k_1}, \ldots, X_{k_{L-1}}$ according to a gradient of the square of the absolute value of the AACF vector, i.e. $\|\rho\|^2$, at the reserved sub-carrier symbol vector $X_R$. For example, an equation (7) can be adopted for modification which is shown as:

$$X_R^{(n+1)} = X_R^{(n)} - \mu\nabla_{X_R}\|\rho\|^2\big|_{X_R^{(n)}} = X_R^{(n)} - \frac{\mu}{2}\begin{bmatrix}\frac{\partial}{\partial X_{k_1}^*}\|\rho\|^2\\ \frac{\partial}{\partial X_{k_2}^*}\|\rho\|^2\\ \vdots\\ \frac{\partial}{\partial X_{k_{L-1}}^*}\|\rho\|^2\end{bmatrix}_{X_R^{(n)}}. \quad (7)$$

This embodiment minimizes the $\|\rho\|^2$ through iteratively calculating the result of $X_R$, wherein n denotes the times for iteration. $X_R^{(n+1)}$ denotes an $n+1^{th}$ modified $X_R$, and $X_R^{(n)}$ denotes an $n+1^{th}$ pre-modified $X_R$. The vector with $n=0$ is denoted by $X_R^{(0)}$ which is not modified and can be equal to the original $X_R$. However, $X_R^{(0)}$ can also be represented by other values. A step size is denoted as $\mu$.

Then, the reserved sub-carrier symbol generation unit 304 generates the combination signal Cmb according to $X_R^{(n+1)}$. As for the symbol $C_i$ in the N combination symbols $C_0, C_1, \ldots, C_{N-1}$ of the combination signal Cmb, when $i \in U$, $C_i = X_i^{(n+1)}$. Afterwards, the combination 306 combines the to-be-combined signal Cmb into the data signal Data in frequency domain, and generates the modified data signal Data'. The data signal Data' can be denoted as $Y_0, Y_1, \ldots, Y_{N-1}$. As for the symbol $Y_i$, when $i \in U$, $Y_i = C_i$; and when $i \notin U$, $Y_i = C_i$. The transmitter 300 has a conversion unit 308, which is for converting the data signal Data' being processed by the combination unit 306, and correspondingly providing a transmitting signal Data" for transmission. The conversion unit 308 can be, for example, an IFFT converter.

The transmitter 300 further includes, for example, a switch 312, which allows the reserved sub-carrier symbol generation unit 304 to calculate the value of the modified $X_R$ and modify the data signal Data' according to the modified data signal Data' during the iterative calculation for the $X_R$. Following that, $X_R$ is modified again, and is modified until the modification times reach the predetermined iteration times.

In addition, the transmitter 300 further includes, for example, a reserved sub-carrier index generator 310, which is for generating the L sub-carrier indices of the reserved sub-carriers mentioned above. The generated indices are outputted to the reserved sub-carrier symbol generation unit 304.

Figure 4:
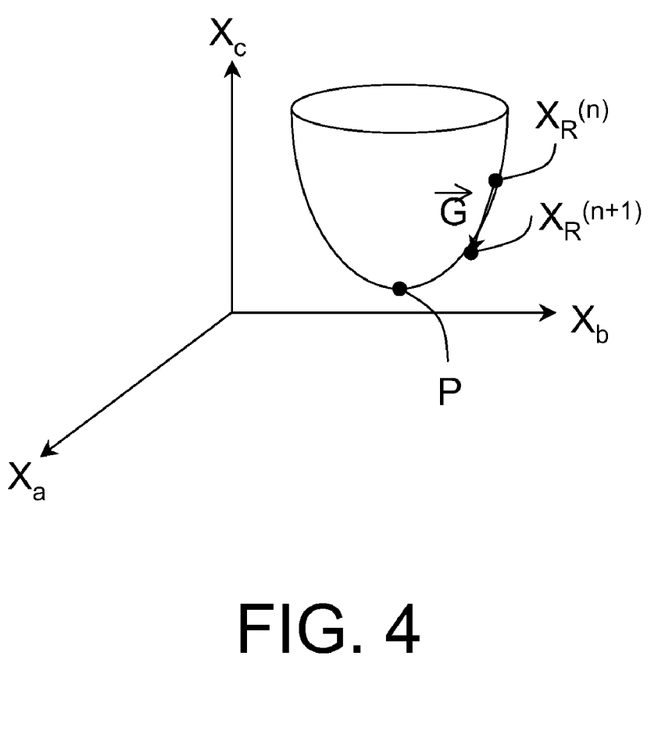
FIG. 4 is a schematic diagram showing an example of $\|\rho\|^2$ in which the number of the reserved sub-carriers is assumed as 3 and the reserved sub-carrier symbols are $X_a$, $X_b$, and $X_c$.

The equation (7) will be described below with its physical meaning. FIG. 4 is a schematic diagram showing an example of $\|\rho\|^2$ in which the number of the reserved sub-carriers is assumed as 3 and the reserved sub-carrier symbols are $X_a$, $X_b$, and $X_c$.

Given the $X_R^{(n)}$, let's define that $\vec{G} = \nabla_{x_R} \|\rho\|^2 |_{x_R^{(n)}}$. The vector $\vec{G}$ can be regarded as a direction at which the variation of value $\|\rho\|^2$ is the largest. In this regard, if $X_R^{(n+1)}$ is determined according to the vector $\vec{G}$, the resultant $X_R^{(n+1)}$ is closer to the extreme value of $\|\rho\|^2$, such as the point P, than $X_R^{(n)}$ is. Therefore, by modifying $X_R$ through finding out $\vec{G}$, the reserved sub-carrier symbols $X_a$, $X_b$, and $X_c$ can be obtained with the value of $\|\rho\|^2$ closer to the point P, which is desired.

Besides, the step unit μ is configured as a value such that the equation (7) can converge. The determination for μ can be done, for example, by referring to a predefined look-up table. The look-up table can be defined according to several communication parameters of the transmitter, such as the number N of the used sub-carriers, or the size for performing FFT.

Figure 5:
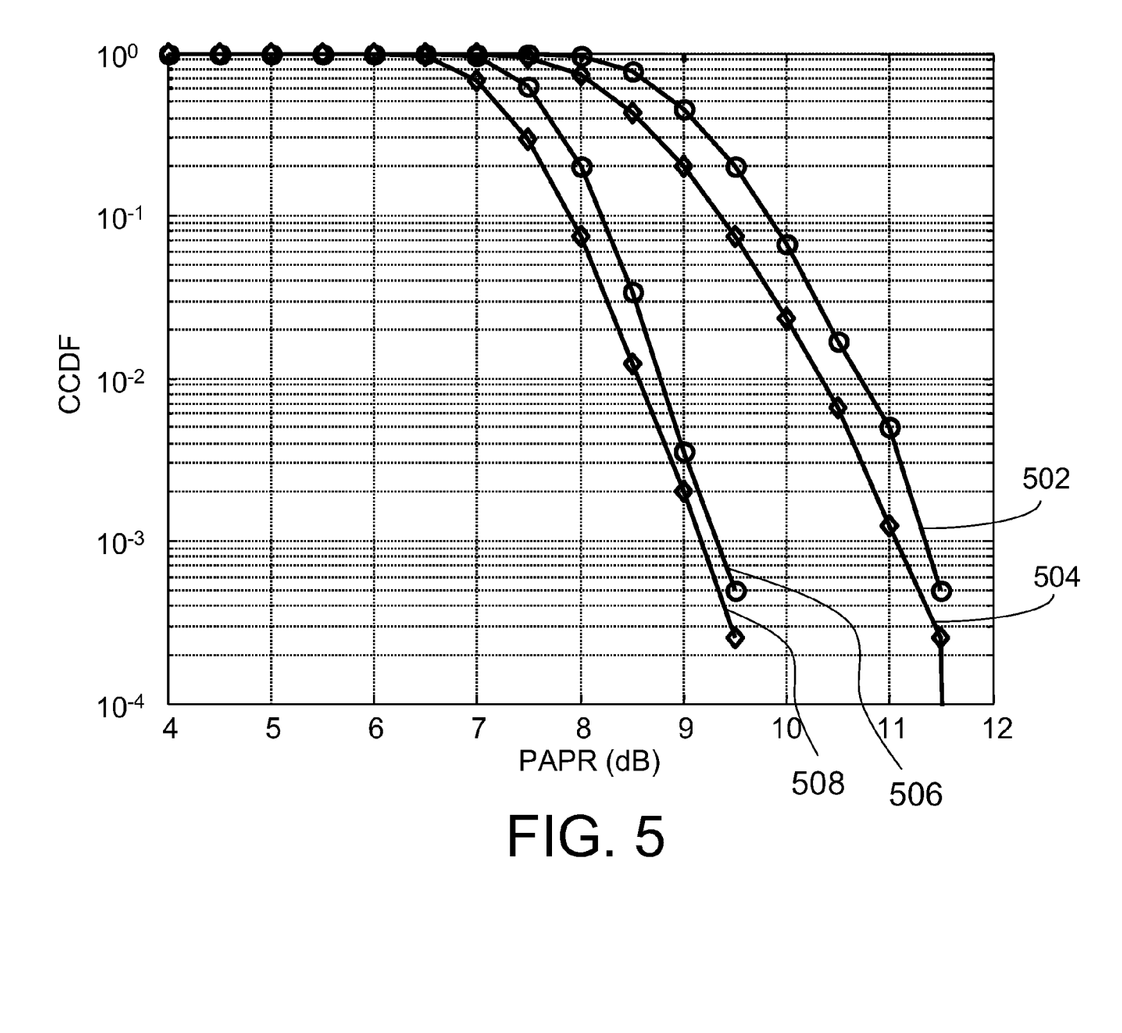
FIG. 5 is a diagram showing the simulation result of the embodiment in FIG. 3.

FIG. 5 is a diagram showing the simulation result of the embodiment. The simulation is performed under the a configuration where the size of FFT is 1024, the number N of the sub-carrier used in the transmitter is 1024, the number L of the reserved sub-carrier is 72, the sub-carrier indices of the reserved sub-carriers are selected with random optimization, the over-sampling rate is 4, the interpolation is implemented as frequency domain zero-padding, and the iteration times are 4.

In FIG. 5, the horizontal axis denotes the PAPR, and the vertical axis denotes a CCDF (Complementary cumulative distribution function, CCDF). The CCDF means that the sum of the probabilities greater than the corresponding value of the PAPR. The lower the CCDF is, the smaller the PAPR the transmitting signal has. The curves 502 and 504 in FIG. 5 denote the CCDF of the original data signal Data, while the curves 506 and 508 denote the CCDF of the original data signal Data which are performed with the method for reducing the PAPR of the data signal according to this embodiment. The curves 502 and 506 provide the results according to a simulation with over-sampling, while the curves 504 and 508 provide the results according to a simulation with Nyquist sampling. As can be seen from FIG. 5, through the method of the embodiment the PAPR has a reduction of about 2 dB, thus reduce the PAPR of the data signal Data' for transmitting while enhance the signal quality.

Figure 6:
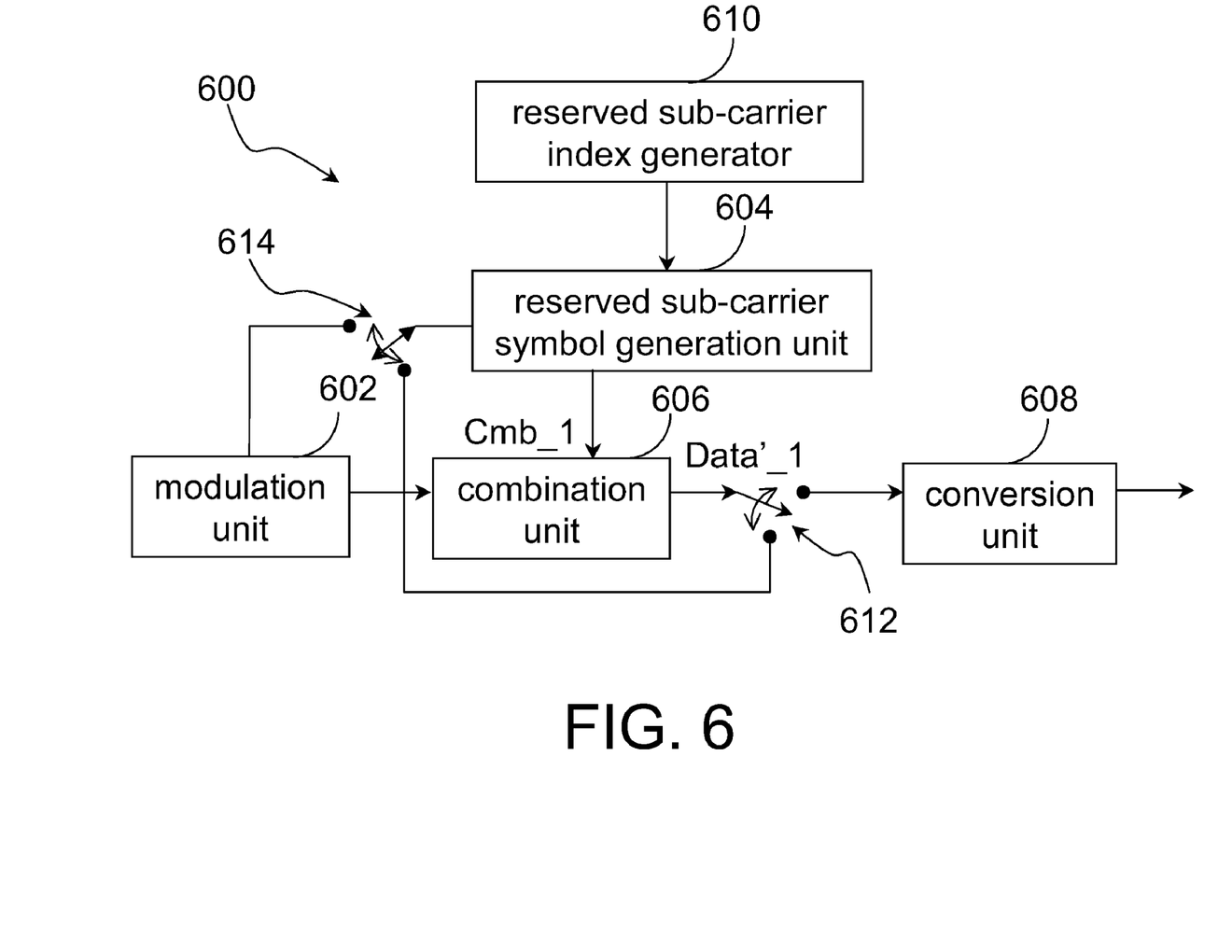
FIG. 6 is a block diagram showing a transmitter 600 for reducing the PAPR of the data signal according to another exemplary embodiment.

FIG. 6 is a block diagram showing a transmitter 600 for reducing the PAPR of the data signal according to another exemplary embodiment. This embodiment differs from the former embodiment in that the L reserved sub-carrier symbols mentioned above are divided into several groups of reserved sub-carrier symbols. In this embodiment, the several groups of reserved sub-carrier symbols are modified sequentially, so as to modify the L reserved sub-carrier symbols.

In transmitter 600, the switch 614 is selectively and electrically connected to the modulation unit 602 and the combination unit 606, and the switch 612 is selectively and electrically connected to the conversion unit 608 and the combination unit 606.

The reserved sub-carrier index generator 610 outputs the indices for different groups of reserved sub-carrier symbol sequentially and respectively, so that the reserved sub-carrier symbol generation unit 604 modifies certain group of reserved sub-carrier symbols only, and generate the combination signal Cmb_1 accordingly. If the reserved sub-carrier symbols have not been modified, the switches 612 and 614 are operated in a manner such that the data signal Data'_1 outputted by the combination unit 606 are fed back to the reserved sub-carrier symbol generation unit 604, and thereby the reserved sub-carrier symbol generation unit 604 is enabled to perform the modification on the next group of the reserved sub-carrier symbols. When all groups of the reserved sub-carrier symbols are modified completely and the modification time reaches the predetermined iteration time, the switch 612 is operated in a manner such that the data signal Data'_1 is outputted to the conversion unit 608.

Figure 7:
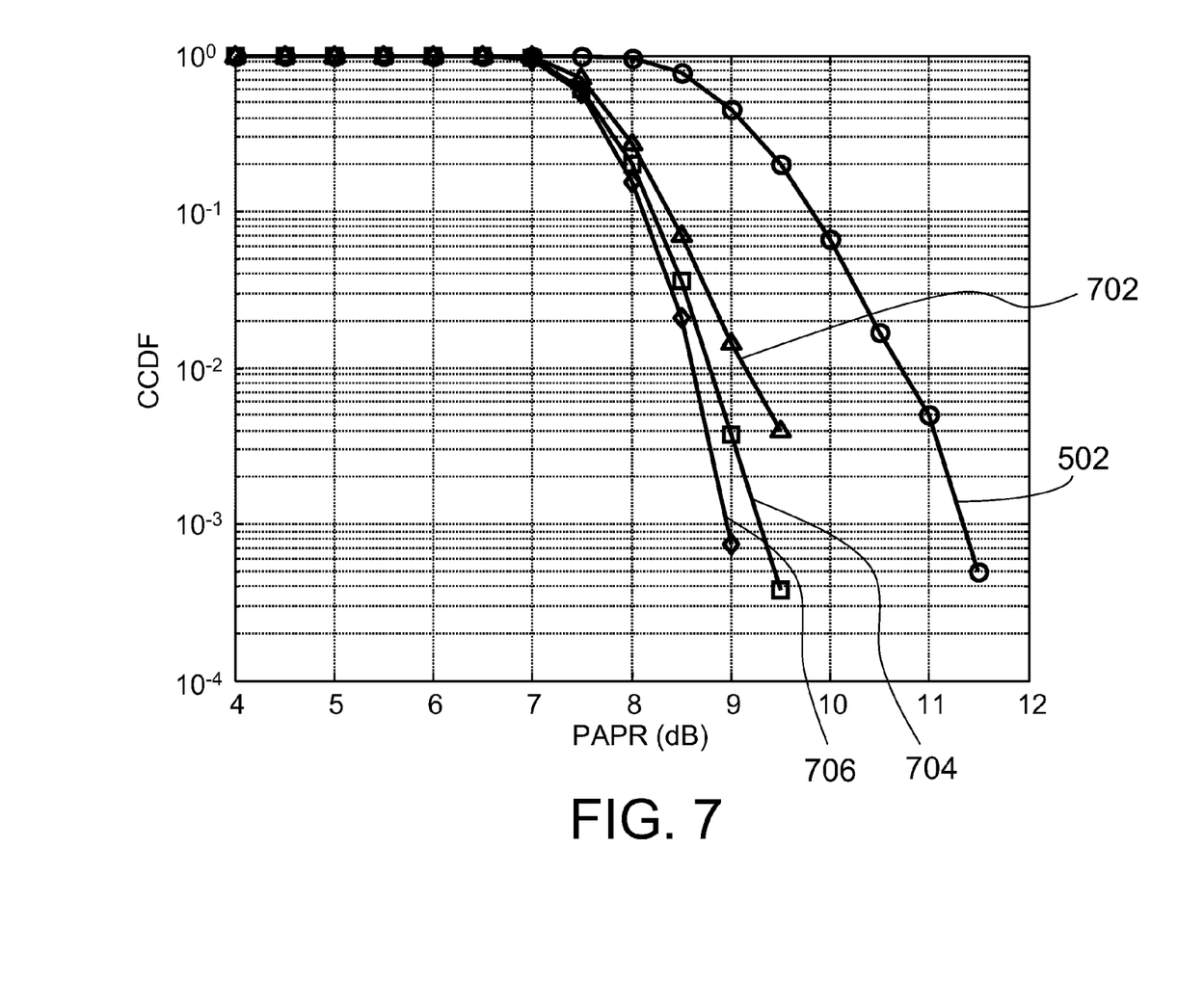
FIG. 7 is a diagram showing the simulation result according to the embodiment in FIG. 6.

FIG. 7 is a diagram showing the simulation result according to this embodiment. The curve 702 provides the result according to a simulation in which L reserved sub-carrier symbols are divided into one group and the iteration times equal to 2. The curve 704 provides the results according to a simulation in which L reserved sub-carrier symbols are divided into two groups and the iteration times equal to 4. The curve 706 provides the results according to a simulation in which L reserved sub-carrier symbols are divided into four groups and the iteration times equal to 4. As can be seen from the curve 706, if L reserved sub-carrier symbols are divided into several groups of reserved sub-carrier symbols and the groups of served sub-carrier symbols are modified sequentially, the PAPR of the signal can be further reduced.

Besides, in still another exemplary embodiment, the L reserved sub-carrier symbols can also be divided into several groups of reserved sub-carrier symbols. In this embodiment, the several groups of reserved sub-carrier symbols are modified in parallel, so as to modify the L reserved sub-carrier symbols. In the course parallel processing, the reserved sub-carriers which have not been processed can be regarded as non-reserved sub-carrier symbols for processing.

Figure 8:
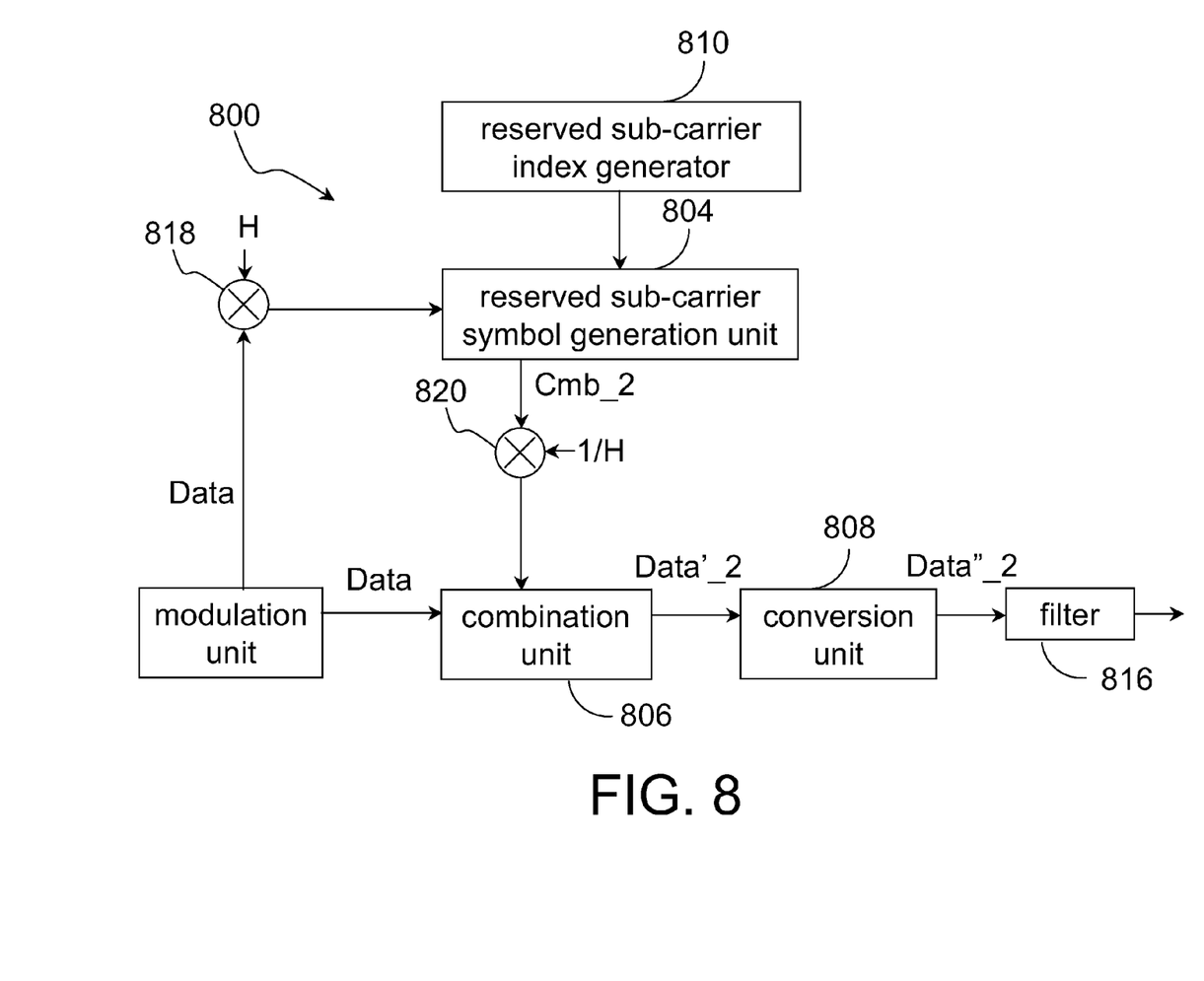
FIG. 8 is a block diagram showing a transmitter 800 according to still another exemplary embodiment.

FIG. 8 is a block diagram showing a transmitter 800 according to still another exemplary embodiment. This embodiment differs from the former embodiment in that the transmitter 800 further includes a filter 816, a first multiplier 818, and a second multiplier 820. The filter 816 has a frequency response function H, wherein $H_k$ denotes the frequency response coefficient at the $k^{th}$ sub-carrier. The first multiplier 818 is for multiplying each of the N data symbols with a corresponding frequency response coefficient $H_k$.

The reserved sub-carrier symbol generation unit 804 modifies the L reserved sub-carrier symbols according to the N data symbols being multiplied with $H_k$, and generates the to-be-combined combination signal Cmb_2 accordingly. The second multiplier 820 is for multiplying the to-be-combined signal Cmb_2 with $1/H_k$, and for outputting the resultant to the combination unit 806. The conversion unit 808 is for converting the data signal Data'_2 being processed by the combination unit 806, for correspondingly providing a transmitting signal Data"_2, and for outputting the transmitting signal Data"_2 to the filter 816.

In this embodiment, the L reserved sub-carrier symbols are modified with a reference data signal which is equivalent to the data signal being processed by the filter 816. Therefore, the L reserved sub-carrier symbols which have been modified in this embodiment are further enabled to eliminate the effect which the filter 816 caused on the peak power of the envelope power of the data signal.

The transmitter and the method therefor disclosed in the exemplary embodiments can be completed in frequency domain, so that a number of IFFT which have been used in the conventional practice are not necessary.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A method for reducing a peak-to-average power ratio (PAPR), the method being applied by using N sub-carriers, L sub-carriers of the N sub-carriers being reserved sub-carriers, L being less than N, the method comprising:

receiving a data signal, the envelope power of the data signal having a constant power and a fluctuant power;

generating L reserved sub-carrier symbols of the L sub-carriers located in the reserved sub-carriers;

modifying the L reserved sub-carrier symbols according to the data signal, and generating a to-be-combined signal accordingly; and combining the to-be-combined signal into the data signal in frequency domain;

wherein the data signal has N data symbols located in the N sub-carriers, the N data symbols correspond to an aperiodic auto-correlation function (AACF) vector, the L reserved sub-carrier symbols correspond to a reserved sub-carrier symbol vector, and in the step of modifying the L reserved sub-carrier symbols, the L reserved sub-carrier symbols are modified according to a gradient or any other algorithmic methods of the square of the absolute value of the AACF vector at the reserved sub-carrier symbol vector, or modified according to the absolute value for the AACF vector to the $p^{th}$ power, wherein p is larger than 0.

2. The method according to claim 1, wherein a set of sub-carrier indices of the L sub-carriers of the reserved sub-carriers is denoted as U, wherein $U=\{k_0, k_1, \ldots k_{L-1}\}$, the N data symbols of the data signal are denoted as $X_0, X_1, \ldots, X_{N-1}$ and the data vector is defined as $X=[X_0, X_1, \ldots, X_{N-1}]^T$ wherein $X_i$ is the $i^{th}$ data symbol, and i is an integer between 0 to N−1, before the data is combined into the reserved sub-carrier symbol, if i∈U, $X_i$=0, the AACF vector is denoted as ρ, the L reserved sub-carrier symbols are denoted as $X_{k_0}, X_{k_1}, \ldots, X_{k_{L-1}}$, the reserved sub-carrier symbol vector is denoted as $X_R=[X_{k_0}, X_{k_1}, \ldots, X_{k_{L-1}}]^T$, $X_R^{(n+1)}$ denotes an n+1$^{th}$ modified $X_R$, and $X_R^{(n)}$ denotes an n+1$^{th}$ pre-modified $X_R$, then it is derived that $$\rho = [\rho(1), \rho(2), \ldots, \rho(N-1)]^T, \text{ and}$$

$$X_R^{(n+1)} = X_R^{(n)} - \mu \nabla_{X_R} \|\rho\|^2 \big|_{X_R^{(n)}},$$

wherein $\rho(u) = \sum_{k=0}^{N-u-1} X_k X_{k+u}^*$ for $1 \le u \le N-1$.

3. The method according to claim 1, wherein the step of modifying the L reserved sub-carrier symbols comprises modifying the L reserved sub-carrier symbols by iteration means.

4. A method for reducing a peak-to-average power ratio (PAPR), the method being applied by using N sub-carriers, L sub-carriers of the N sub-carriers being reserved sub-carriers, L being less than N, the method comprising:

receiving a data signal, the envelope power of the data signal having a constant power and a fluctuant power;

generating L reserved sub-carrier symbols of the L sub-carriers located in the reserved sub-carriers;

modifying the L reserved sub-carrier symbols according to the data signal, and generating a to-be-combined signal accordingly; and combining the to-be-combined signal into the data signal in frequency domain;

wherein the L reserved sub-carrier symbols are divided into several groups of reserved sub-carrier symbols, and in the step of modifying the L reserved sub-carrier symbols, the several groups of reserved sub-carrier symbols are modified sequentially or in parallel so as to modify the L reserved sub-carrier symbols.

5. A method for reducing a peak-to-average power ratio (PAPR), the method being applied by using N sub-carriers, L sub-carriers of the N sub-carriers being reserved sub-carriers, L being less than N, the method comprising:

receiving a data signal, the envelope power of the data signal having a constant power and a fluctuant power;

generating L reserved sub-carrier symbols of the L sub-carriers located in the reserved sub-carriers;

modifying the L reserved sub-carrier symbols according to the data signal, and generating a to-be-combined signal accordingly; and combining the to-be-combined signal into the data signal in frequency domain;

wherein the transmitter comprises a filter, the filter has a frequency response function denoted as H, $H_k$ denotes the frequency response coefficient at the $k^{th}$ sub-carrier, the data signal has N data symbols located in N sub-carriers, and the step of modifying the L reserved sub-carrier symbols comprises the following steps:

multiplying the N data symbols with a corresponding $H_k$, respectively;

modifying the L reserved sub-carrier symbols according to the N data symbols being multiplied with $H_k$; and multiplying the to-be-combined signal with $1/H_k$;

wherein the to-be-combined signal being multiplied with $1/H_k$ is served as the to-be-combined signal for use in combining with the data signal.

6. A transmitter, applied in an orthogonal frequency division multiplexing (OFDM) based system, the transmitter using N sub-carriers, L sub-carriers of the N sub-carriers being reserved sub-carriers, L being less than N, the transmitter comprising:

a modulation unit, for outputting a data signal, the envelope power of the data signal having a constant power and a fluctuant power;

a reserved sub-carrier symbol generation unit, for generating L reserved sub-carrier symbols of the L sub-carriers located in the reserved sub-carriers, for modifying the L reserved sub-carrier symbols according to the data signal and generating a to-be-combined signal accordingly; and a combination unit, for combining the to-be-combined signal into the data signal in frequency domain;

wherein the data signal has N data symbols located in the N sub-carriers, the N data symbols correspond to an aperiodic auto-correlation function (AACF) vector, the L reserved sub-carrier symbols correspond to a reserved sub-carrier symbol vector, and the modulation unit modifies the L reserved sub-carrier symbols according to a gradient or any other algorithmic methods of the square of the absolute value of the AACF vector at the reserved sub-carrier symbol vector, or according to the absolute value for the AACF vector to the $p^{th}$ power, wherein p is larger than 0.

7. The transmitter according to claim 6, wherein a set of sub-carrier indices of the L sub-carriers of the reserved sub-carriers is denoted as U, wherein U=$\{k_0, k_1, \ldots k_{L-1}\}$, the N data symbols of the data signal are denoted as $X_0, X_1, \ldots, X_{N-1}$ and the data vector is defined as X=$[X_0, X_1, \ldots, X_{N-1}]^T$, wherein $X_i$ is the $i^{th}$ data symbol, and i is an integer between 0 to N−1, before the data is combined into the reserved sub-carrier symbol, if $i \in U$, $X_i=0$, the AACF vector is denoted as ρ, the L reserved sub-carrier symbols are denoted as $X_{k_0}$, $X_{k_1}, \ldots, X_{k_{L-1}}$, the reserved sub-carrier symbol vector is denoted as $X_R=[X_{k_0}, X_{k_1}, \ldots, X_{k_{L-1}}]^T$, $X_R^{(n+1)}$ denotes an n+1$^{th}$ modified $X_R$, and $X_R^{(n)}$ denotes an n+1$^{th}$ pre-modified $X_R$, then it is derived that $$\rho = [\rho(1), \rho(2), \ldots, \rho(N-1)]^T, \text{ and}$$

$$X_R^{(n+1)} = X_R^{(n)} - \mu \nabla_{X_R} \|\rho\|^2 \mid_{X_R^{(n)}},$$

wherein $\rho(u) = \sum_{k=0}^{N-u-1} X_k X_{k+u}^*$ for $1 \le u \le N-1$.

8. The transmitter according to claim 6, wherein the modulation unit modifies the L reserved sub-carrier symbols by iteration means.

9. A transmitter, applied in an orthogonal frequency division multiplexing (OFDM) based system, the transmitter using N sub-carriers, L sub-carriers of the N sub-carriers being reserved sub-carriers, L being less than N, the transmitter comprising:
a modulation unit, for outputting a data signal, the envelope power of the data signal having a constant power and a fluctuant power;
a reserved sub-carrier symbol generation unit, for generating L reserved sub-carrier symbols of the L sub-carriers located in the reserved sub-carriers, for modifying the L reserved sub-carrier symbols according to the data signal and generating a to-be-combined signal accordingly; and
a combination unit, for combining the to-be-combined signal into the data signal in frequency domain;
wherein the L reserved sub-carrier symbols comprise several groups of reserved sub-carrier symbols, and the modulation unit modifies the L reserved sub-carrier symbols sequentially or in parallel, so as to modify the L reserved sub-carrier symbols.

10. A transmitter, applied in an orthogonal frequency division multiplexing (OFDM) based system, the transmitter using N sub-carriers, L sub-carriers of the N sub-carriers being reserved sub-carriers, L being less than N, the transmitter comprising:
a modulation unit, for outputting a data signal, the envelope power of the data signal having a constant power and a fluctuant power;
a reserved sub-carrier symbol generation unit, for generating L reserved sub-carrier symbols of the L sub-carriers located in the reserved sub-carriers, for modifying the L reserved sub-carrier symbols according to the data signal and generating a to-be-combined signal accordingly; and
a combination unit, for combining the to-be-combined signal into the data signal in frequency domain;
wherein the data signal has N data symbols located in N sub-carriers, and the transmitter further comprises:
a filter, having a frequency response function denoted as H, wherein $H_k$ denotes the frequency response coefficient at the $k^{th}$ sub-carrier
a first multiplier, for multiplying the N data symbols with a corresponding $H_k$, respectively, wherein the reserved sub-carrier symbol generation unit modifies the L reserved sub-carrier symbols according to the N data symbols being multiplied with $H_k$, and generating the to-be-combined signal accordingly;
a second multiplier, for multiplying the to-be-combined signal with $1/H_k$, and for outputting the multiplied signal to the combination unit; and
a conversion unit, for converting the data signal being processed by the combination unit into a time-domain transmitting signal, and for outputting the transmitting signal to the filter.

* * * * *